United States Patent
Maekawa

(10) Patent No.: US 9,565,324 B2
(45) Date of Patent: Feb. 7, 2017

(54) APPARATUS, NON-TRANSITORY COMPUTER READABLE MEDIUM, AND METHOD

(71) Applicant: FUJI XEROX CO., LTD., Tokyo (JP)

(72) Inventor: Takao Maekawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 13 days.

(21) Appl. No.: 14/605,095

(22) Filed: Jan. 26, 2015

(65) Prior Publication Data

US 2016/0088176 A1    Mar. 24, 2016

(30) Foreign Application Priority Data

Sep. 19, 2014  (JP) .................................. 2014-191928

(51) Int. Cl.
| | |
|---|---|
| *H04N 1/00* | (2006.01) |
| *G06F 3/14* | (2006.01) |
| *G06F 3/0488* | (2013.01) |
| *G06F 3/0482* | (2013.01) |
| *G06F 3/0485* | (2013.01) |
| *G06F 3/0484* | (2013.01) |

(52) U.S. Cl.
CPC ........ *H04N 1/00482* (2013.01); *G06F 3/0482* (2013.01); *G06F 3/0485* (2013.01); *G06F 3/0488* (2013.01); *G06F 3/04847* (2013.01); *G06F 3/1423* (2013.01); *H04N 1/0097* (2013.01); *H04N 1/00477* (2013.01); *H04N 2201/0094* (2013.01)

(58) Field of Classification Search
CPC ............ H04N 1/00482; H04N 1/00477; H04N 1/0097; H04N 2201/0094; G06F 3/0484; G06F 3/1423
USPC ...... 358/1.13, 1.15; 715/700, 784, 788, 790, 715/791, 794, 798, 799
See application file for complete search history.

(56) References Cited

U.S. PATENT DOCUMENTS

2009/0031235 A1* 1/2009 Martin ................. G03G 15/502
                                                715/765
2010/0027058 A1* 2/2010 Okada ................ H04N 1/00209
                                                358/1.15

FOREIGN PATENT DOCUMENTS

| JP | 2003-280463 A | 10/2003 |
| JP | 2010-103722 A | 5/2010 |

* cited by examiner

*Primary Examiner* — Kent Yip
(74) *Attorney, Agent, or Firm* — Sughrue Mion, PLLC

(57) ABSTRACT

An apparatus includes a controller that controls a display to display a setting status of a setting item set for executing a predetermined process, and an accepting unit that accepts a change to the setting status. When the accepting unit accepts the change to the setting status, the controller controls the display to display an item that accepts an indication to reset the changed setting status to the setting status set prior to the change.

16 Claims, 13 Drawing Sheets

FIG. 3

| SETTING ITEM | CANDIDATE SETTING | SETTING FLAG |
|---|---|---|
| Paper Supply | Auto | 1 |
| | Tray1 | 0 |
| | Tray2 | 0 |
| 2-Sided | Auto | 1 |
| | On | 0 |
| | Off | 0 |

FIG. 4

| SETTING ITEM | DEFAULT VALUE |
|---|---|
| Paper Supply | Auto |
| 2-Sided | Auto |

FIG. 6

| Paper Supply | Auto |
| --- | --- |
| 2-Sided | Auto |
| Reduce / Enlarge | 100% |
| Edge Erase | Off |
| Original Type | Normal |
| Page Layout | Off |
| Sharpness | Auto |

FIG. 7

| Paper Supply | Auto |
| --- | --- |
| 2-Sided | Auto |
| Reduce / Enlarge | 100% |
| Edge Erase | Off |
| Original Type | Normal |
| Page Layout | Off |
| Sharpness | Auto |

- Auto ●
- Tray1 ○
- Tray2 ○

APPARATUS, NON-TRANSITORY COMPUTER READABLE MEDIUM, AND METHOD

CROSS-REFERENCE TO RELATED APPLICATIONS

This application is based on and claims priority under 35 USC 119 from Japanese Patent Application No. 2014-191928 filed Sep. 19, 2014.

BACKGROUND

Technical Field

The present invention relates to an apparatus, a non-transitory computer readable program, and a method.

SUMMARY

According to an aspect of the invention, there is provided an apparatus including a controller that controls a display to display a setting status of a setting item set for executing a predetermined process, and an accepting unit that accepts a change to the setting status. When the accepting unit accepts the change to the setting status, the controller controls the display to display an item that accepts an indication to reset the changed setting status to the setting status set prior to the change.

BRIEF DESCRIPTION OF THE DRAWINGS

Exemplary embodiments of the present invention will be described in detail based on the following figures, wherein:

FIG. 3 illustrates an example of settings information;

FIG. 4 illustrates an example of default settings information;

FIG. 6 illustrates an example of a settings list screen displayed on a display;

FIG. 7 illustrates an example of a settings information changing process by a setting status changing unit;

DETAILED DESCRIPTION

Hereinafter, exemplary embodiments of the invention will be described with reference to the drawings. The following description will be directed to a case where the exemplary embodiments are applied to an image processing apparatus as an example of an apparatus.

First Exemplary Embodiment

Figure 1:
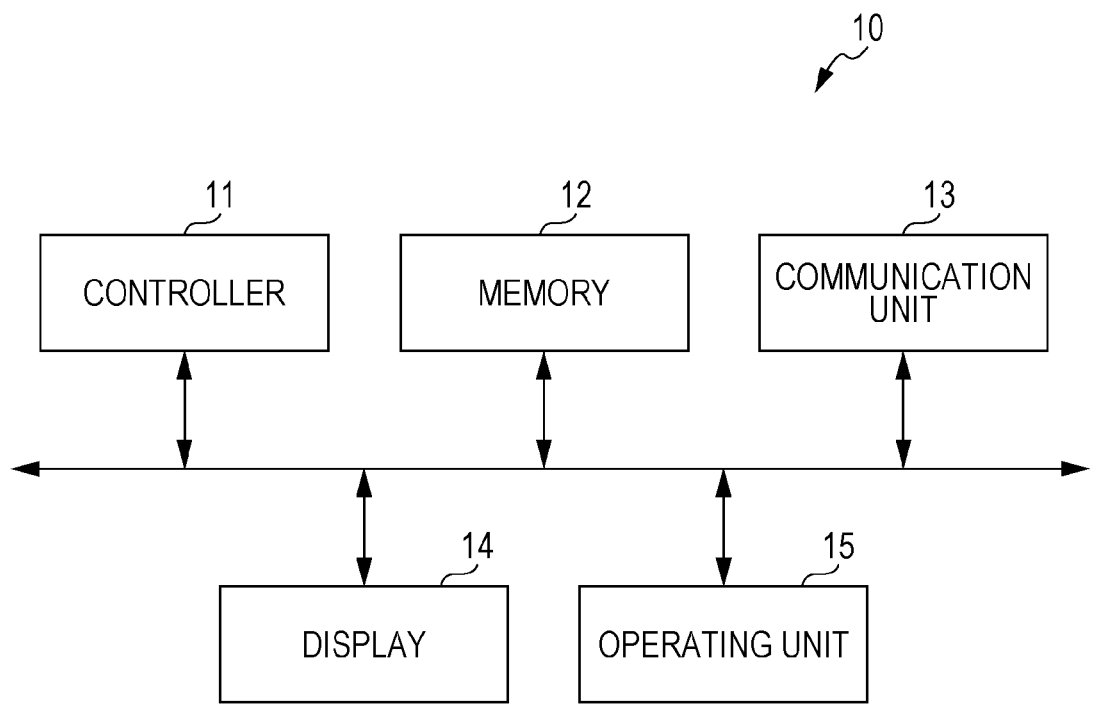
FIG. 1 illustrates an example of the hardware configuration of an image processing apparatus according to the exemplary embodiments.

An image processing apparatus 10 according to the exemplary embodiments is, for example, a multi-function machine having functions such as print, copy, scan, and facsimile. The image processing apparatus 10 executes image processing that may be implemented by these functions. As illustrated in FIG. 1, the image processing apparatus 10 according to the exemplary embodiments includes a controller 11, a memory 12, a communication unit 13, a display 14, and an operating unit 15. These components are interconnected via a bus. The image processing apparatus 10 may be an apparatus such as a copier, a printer, a scanner, or a facsimile.

The controller 11 is, for example, a CPU. The controller 11 executes various information processing in accordance with a program stored in the memory 12.

The memory 12 includes, for example, a memory device such as a RAM or a ROM, and a hard disk. The memory 12 holds a program executed by the controller 11, and various data. The memory 12 also acts as a work memory for the controller 11.

The communication unit 13 is, for example, a network interface such as a LAN card. The communication unit 13 transmits and receives information to and from another information processing apparatus via a communication part such as a LAN or a wireless communication network.

The display 14 is, for example, a liquid crystal display. Data output from the controller 11 is displayed on the display 14.

The operating unit 15 includes a pointing device such as a keyboard or a mouse, an input device such as a touch pad, and a hard button such as an operating button. The operating unit 15 is used for a user to input various data to the image processing apparatus 10.

In the exemplary embodiments, when the image processing apparatus 10 executes image processing, a screen for confirming the setting status of each setting related to image processing is displayed on the display 14, and the settings are made by causing a user to input settings from the operating unit 15. In the exemplary embodiments, a screen for confirming the status of each setting related to image processing is displayed on a touch panel in which the display 14 and the operating unit 15 are integrated, and the settings are made when the user inputs settings to the touch panel.

Figure 2:
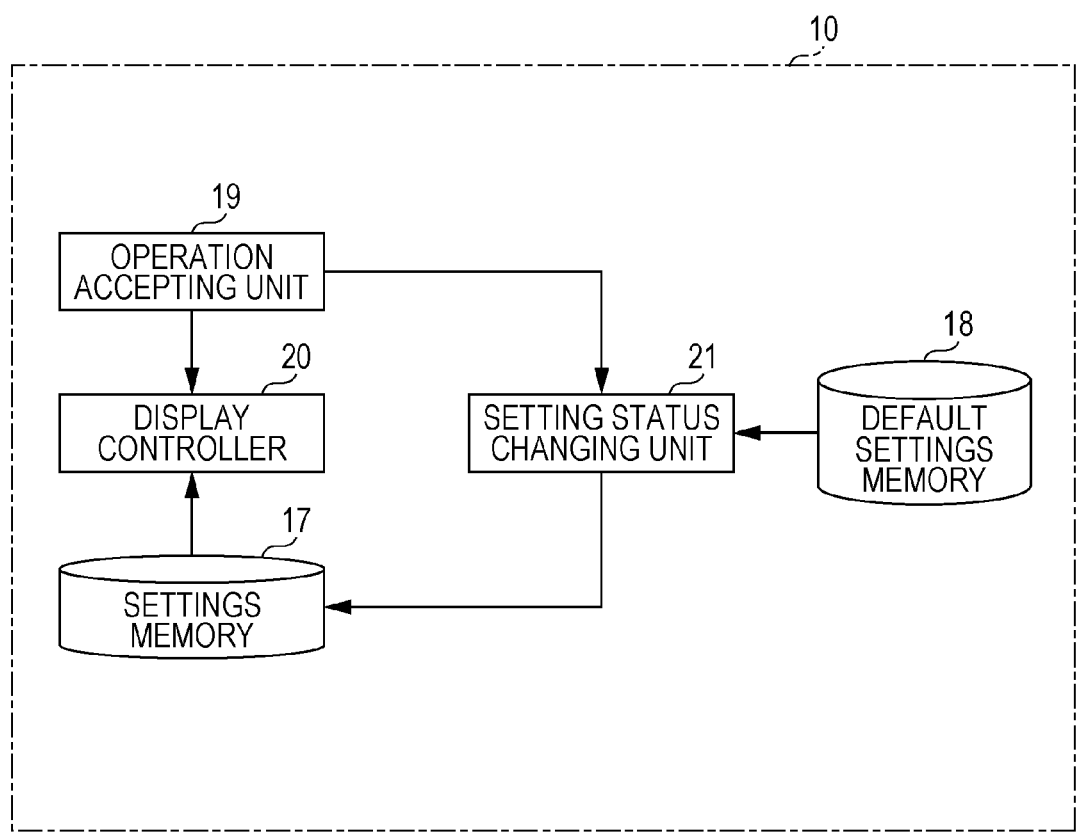
FIG. 2 is a functional block diagram illustrating an example of functions implemented by the image processing apparatus according to the exemplary embodiments.

FIG. 2 is a functional block diagram illustrating an example of functions implemented by the image processing apparatus 10 according to the exemplary embodiments. As illustrated in FIG. 2, the image processing apparatus 10 according to the exemplary embodiments includes, for example, the following functions: a settings memory 17, a default settings memory 18, an operation accepting unit 19, a display controller 20, and a setting status changing unit 21. These functions are implemented as the controller 11 executes a program stored in the memory 12. This program is supplied to the image processing apparatus 10 via a computer readable information storage medium such as an optical disc, a magnetic disk, a magnetic tape, a magneto-optical disk, or a flash memory, or via a communication part such as the Internet. The settings memory 17 and the default settings memory 18 are implemented by the memory 12.

The settings memory 17 stores settings information indicative of the setting status of each of multiple settings used for image processing. FIG. 3 illustrates an example of settings information. The settings information illustrated in FIG. 3 is related to printing. In the settings information, setting items, candidate settings, and a setting flag are associated with each other. A setting item represents an item of setting used to form images. Examples of setting items include "Paper Supply (paper tray)" and "2-sided (duplex printing)". A candidate setting represents a candidate for setting status that may be set for a setting item. For example, the following three candidates for setting status, "Auto", "Tray1", and "Tray2", are associated with the item "Paper Supply (paper tray)", and the following three candidates for setting status, "Auto", "on", and "off", are associated with the item "2-sided (duplex printing)." A setting flag is a flag indicative of the setting status being currently set for a setting item. For example, "1" is assigned to the setting status that is currently set, and "0" is assigned to a setting status that is not currently set. At this time, "Auto" means that the most suitable setting status is selected in accordance with the image to be formed. For example, for the item "Paper Supply (paper tray)", "Tray1" or "Tray2" is selected depending on the size of the image to be formed.

The default settings memory 18 stores default settings information indicative of the default setting for each of multiple settings used for image processing. FIG. 4 illustrates an example of default settings information. As illustrated in FIG. 4, in the default settings information, setting items and their default values are associated with each other. The setting items are the same as the setting items included in the settings information. As a default value, among candidates for setting status for a setting item, one candidate selected as default is associated with the setting item. For example, "Auto" is associated with the item "Paper Supply (paper tray)" as a default value, and "Auto" is associated with the item "2-sided (duplex printing" as a default value.

The operation accepting unit 19 accepts a user-indicated operation on the operating unit 15. Information indicative of the user operation accepted by the operation accepting unit 19 is output to the display controller 20 or the setting status changing unit 21.

The display controller 20 causes the display 14 to display an image in response to an operation accepted by the operation accepting unit 19. For example, on the basis of settings information stored in the settings memory 17, the display controller 20 causes the display 14 to display a settings list screen 100, which shows a list of the setting status of each of multiple setting items used for image processing. At this time, the display controller 20 may cause the display 14 to display the settings list screen 100 that is a single image having a size corresponding to a display area 200 of the display 14 and showing the setting status for all of the setting items included in the settings information, or may cause the display 14 to display a given area of the settings list screen 100 that is an image larger than the display area 200 of the display 14.

Figure 5:
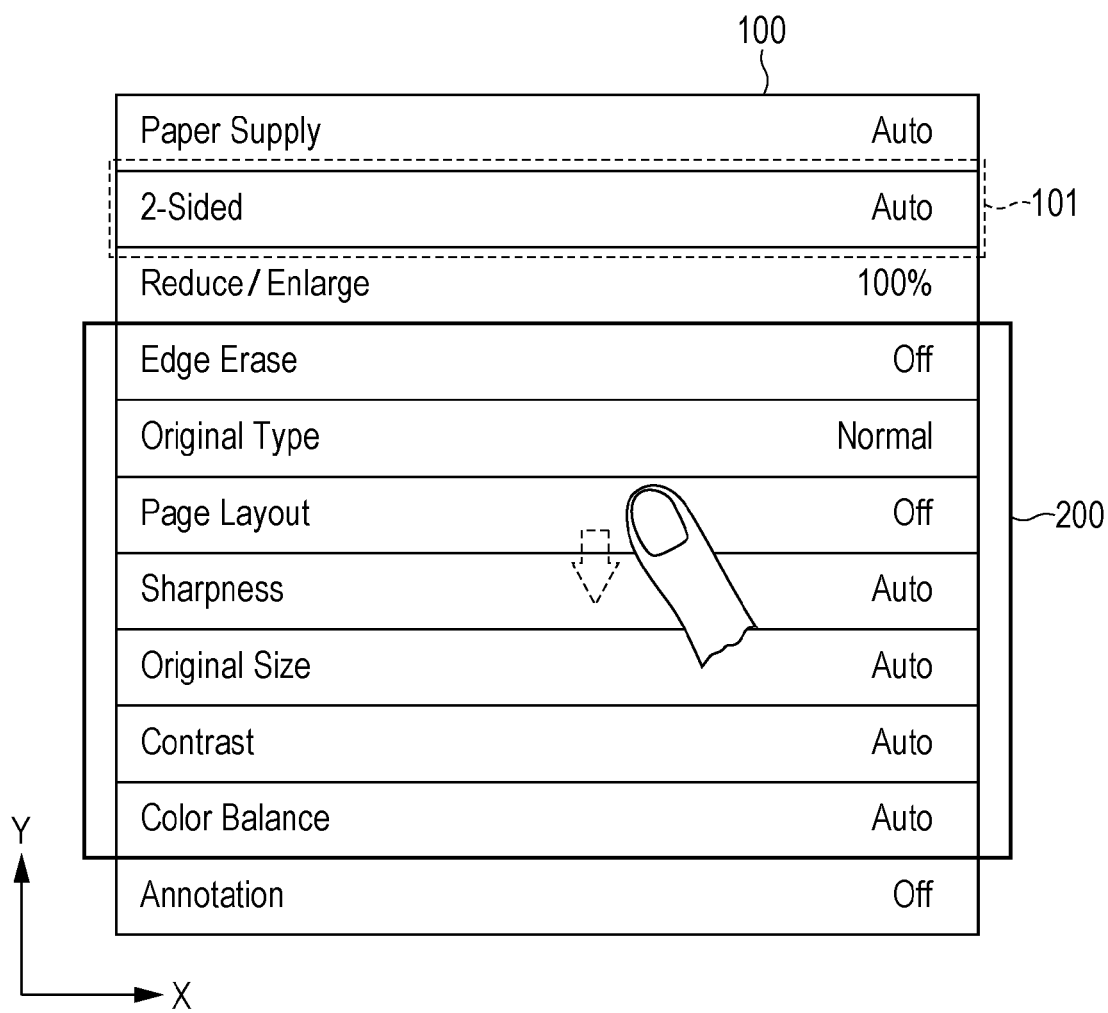
FIG. 5 illustrates an example of a settings list screen displayed on a display.

FIGS. 5 and 6 each illustrate an example of the settings list screen 100 displayed on the display 14. As illustrated in FIG. 5, on the settings list screen 100, setting item images 101 based on the settings information illustrated in FIG. 3 are arranged in order. Each of the setting item images 101 shows a setting item, and a setting status (which represents the candidate setting that is assigned a setting flag "1" in the settings information) for the setting item. The settings list screen 100, which is arranged so as to extend beyond the area (the display area 200) displayed on the display 14 vertically (in the Y-direction), is moved virtually up and down with respect to the display area 200 in response to user operation. For example, in a state in which the setting item images 101 are displayed as illustrated in FIG. 5 (the fourth to tenth setting item images 101 are displayed), when the user executes a downward slide gesture while keeping his/her fingertip in touch with the panel surface of the display 14, the settings list screen 100 moves downward relative to the display area 200 by an amount corresponding to the amount of the slide. As a result, as illustrated in FIG. 6, the first to sixth setting item images are now displayed on the display 14. When the user executes an upward slide gesture while keeping his/her fingertip in touch with the panel surface of the display 14, the settings list screen 100 moves upward relative to the display area 200 by an amount corresponding to the amount of the slide. As a result, a given area of the settings list screen 100 becomes located within the display area 200, and the corresponding setting item images 101 are displayed on the display 14. The settings list screen 100 may be arranged so as to extend beyond the area (the display area 200) displayed on the display 14 horizontally (in the X-direction). Further, a slide bar may be displayed in the display area 200 so that as the user slides the slide bar up and down, the settings list screen 100 moves upward and downward relative to the display area 200 by an amount corresponding to the amount of the slide. Information about such user operation is accepted by the operation accepting unit 19 which then outputs the information to the display controller 20. The display controller 20 updates the image displayed on the display 14 on the basis of the information about user operation.

The setting status changing unit 21 changes the settings information stored in the settings memory 17, in accordance with the operation accepted by the operation accepting unit 19. Specifically, the setting status is changed by changing the candidate setting to which a setting flag "1" is assigned for a setting item in the settings information. In the exemplary embodiments, the setting status changing unit 21 changes the settings information upon accepting a user's indication to select a setting on the settings list screen 100.

Figure 8:
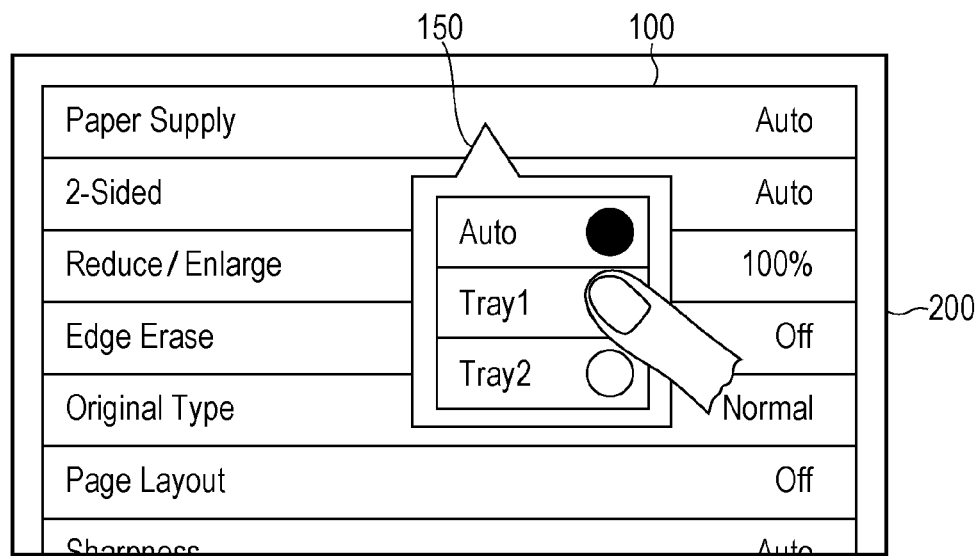
FIG. 8 illustrates an example of a settings information changing process by a setting status changing unit.

FIGS. 7 and 8 each illustrate an example of a settings information changing process by the setting status changing unit 21. When the user performs an operation such as a click on the settings list screen 100 illustrated in FIG. 7 to indicate a selection of the setting item image 101 whose setting is to changed, a pop-up menu is displayed as a selection screen, which allows the user to select a setting from multiple candidate settings that may be set. For example, as illustrated in FIG. 7, when the setting item image 101 for the setting item "Paper Supply" is selected, a pop-up image 150 showing three candidate settings, "Auto", "Tray1", and "Tray2", is displayed. The candidate settings displayed at this time are the same as the candidate settings associated with "Paper Supply" in the settings information stored in the settings memory. At this time, the candidate setting being currently set (which is assigned a setting flag "1" in the settings information) is highlighted in color, bold type, or the like to indicate that this candidate setting has been already set. In FIG. 7, the candidate setting being currently set is designated by "●", and other candidate settings are designated by "○". When the user indicates a selection of one of the multiple candidate settings by an operation such as a click as illustrated in FIG. 8, the operation accepting unit 19 accepts the indicated selection, and outputs the indicated selection to the setting status changing unit 21. For the setting item to be changed ("Paper Supply" in this example) among setting items in the settings information, the setting status changing unit 21 sets the setting flag for the candidate setting being selected (it is assumed that "Tray1" is selected in this example) to "1", and sets the setting flag for the candidate setting "Auto", for which the setting flag is previously set as "1", to "0".

The selection screen is not limited to a pop-up menu. The selection screen may be a screen that is switched to from the settings list screen 100 and displayed on the entire display screen. In this case, when the user selects the setting item image 101 whose setting is to be changed, the selection screen may be switched to from the settings list screen 100 and displayed on the display screen. Then, when the user finishes changing a setting on the selection screen, the settings list screen 100 may be displayed on the display screen. Further, an indication to select a setting may be accepted when the user operates an operating button used to select a setting which is provided in the operating unit 15 of the image processing apparatus.

In the exemplary embodiments, after the settings information is changed by the setting status changing unit 21, the display controller 20 causes the display 14 to display the settings list screen 100 based on the settings information that has been changed. At this time, if the changed settings information stored in the settings memory, and the default settings information stored in the default settings memory do not match, the display controller 20 causes the display 14 to display a Reset button. The Reset button is an item that accepts an indication from the user to reset the changed setting status to the setting status set prior to the change. At this time, pressing the Reset button resets the changed setting status to the setting status indicated by the default settings information stored in the default settings memory 18. The default settings information may be changed as desired, and settings information set at a predetermined time may be stored as default settings information. For example, if settings information changed by the setting status changing unit 21 at a given point in time is stored as default settings information, pressing the Reset button allows a reset to the settings information set at that point in time. The Reset button is not displayed if the changed settings information stored in the settings memory and the default settings information stored in the default settings memory match.

Figure 9:
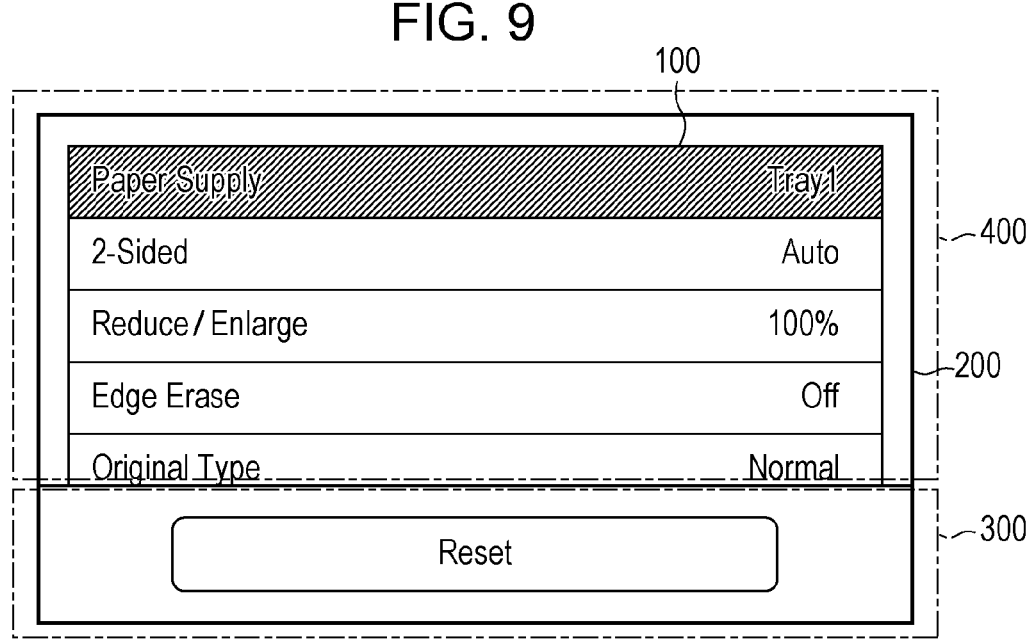
FIG. 9 illustrates an example of a Reset button displayed on a display together with a settings list screen.

FIG. 9 illustrates an example of a Reset button displayed on the display 14 together with the settings list screen 100. FIG. 9 illustrates the state of the display 14 after the setting status of the setting item "Paper Supply" is changed from the default "Auto" to "Tray1" in FIG. 8. As illustrated in FIG. 9, the setting item whose setting status has been changed from default is highlighted in color, bold type, or the like (shaded in FIG. 9) to indicate that its setting status has been changed from default. Then, the Reset button is displayed in a Reset button region 300 within the display area 200 (the lowermost region of the display area 200 in FIG. 9). While the Reset button region 300 is rectangular in this example, this is not intended to be limiting but the Reset button may have any shape. The Reset button is displayed in an overlapping manner on the settings list screen 100 displayed on the display 14, and a region of the settings list screen 100 which overlaps the Reset button region 300 becomes hidden by the Reset button region 300. Thereafter, the settings list screen 100 is displayed in a list screen region 400 located above the Reset button region 300. Even while the Reset button is displayed, the settings list screen 100 may be moved in response to user operation, in which case the settings list screen 100 virtually moves up and down with respect to the list screen region 400 in response to user operation. At this time, while the settings list screen 100 virtually moves up and down in response to user operation, the Reset button remains displayed on the Reset button region 300 at all times. This allows the user to easily perform a reset operation whenever necessary.

Figure 10:
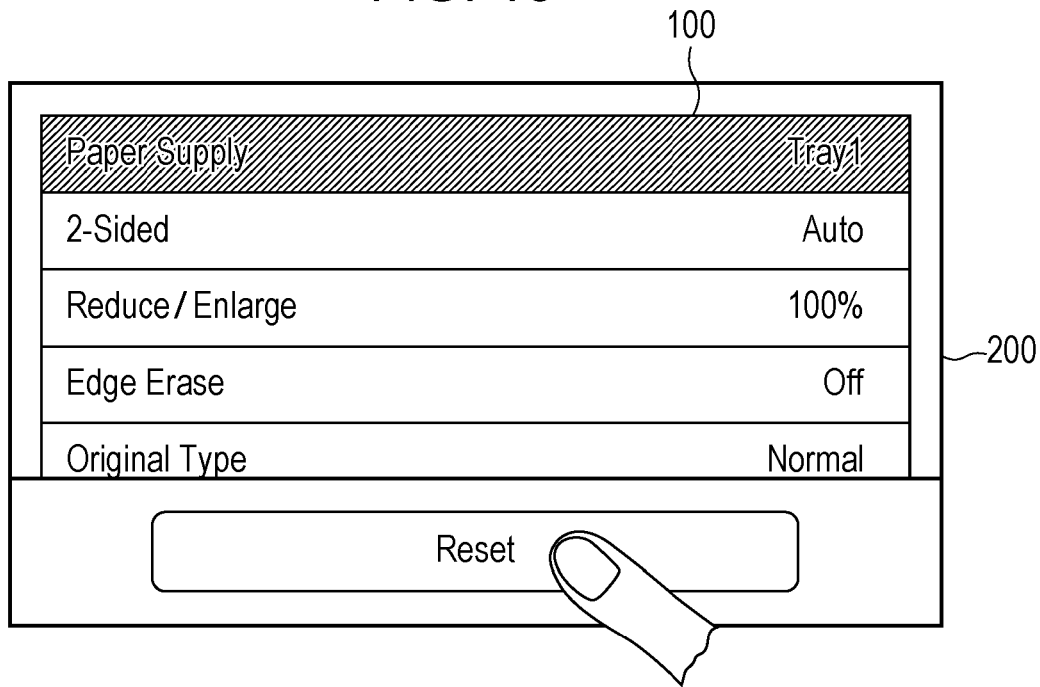
FIG. 10 illustrates a settings list screen when a Reset button is selected.
Figure 11:
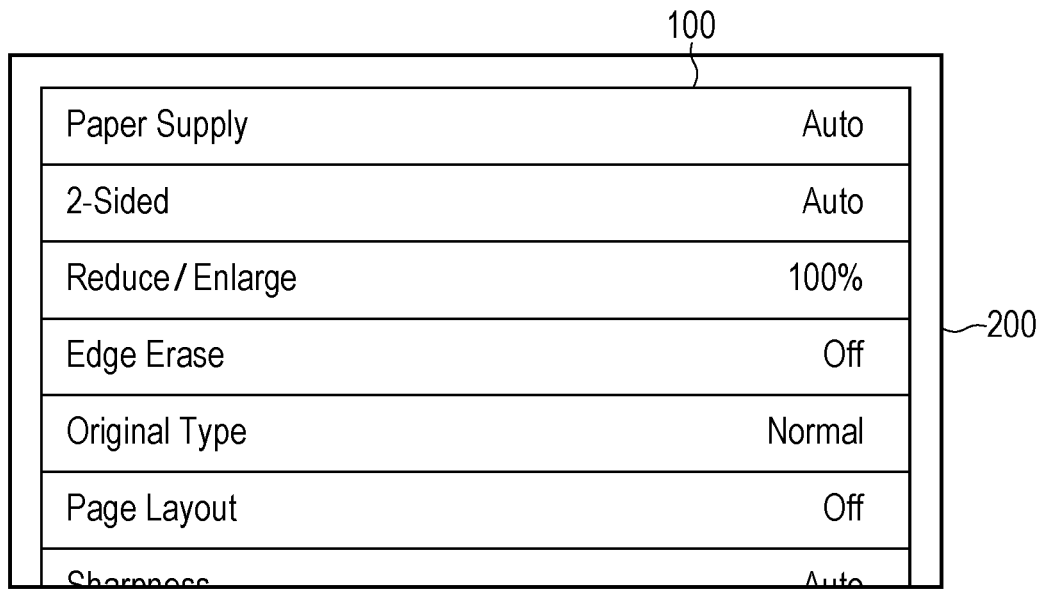
FIG. 11 illustrates a settings list screen when a Reset button is selected.

FIGS. 10 and 11 each illustrate the settings list screen 100 when the Reset button is selected. As illustrated in FIG. 10, when the user selects the Reset button (by, for example, a tap operation), the operation accepting unit 19 accepts the indication of a reset, and outputs the indicated reset to the setting status changing unit 21. When the setting status changing unit 21 changes the setting status so that the settings information stored in the settings memory matches the default settings information stored in the default settings memory 18, the display controller 20 acquires the settings information stored in the settings memory, and displays the settings list screen 100 on the display 14 as illustrated in FIG. 11 which reflects default settings. FIG. 11 illustrates the state of the settings list screen 100 after the Reset button is selected. As illustrated in FIG. 11, the setting status of the setting item "Paper Supply", which has been changed in FIG. 10, is now changed to the default setting "Auto" and displayed as such. As the settings list screen 100 reflecting default settings is displayed by the display controller 20, the Reset button is erased from the display 14. At this time, when, on the settings list screen 100 illustrated in FIG. 10, a setting item whose setting status has been changed ("Paper Supply" in this example) is selected and default ("Auto" in this example) is selected as the setting status, the operation accepting unit 19 accepts the indicated selections, and outputs the indicated selections to the setting status changing unit. When the setting status changing unit 21 changes the setting status so that the settings information stored in the settings memory matches the default settings information stored in the default settings memory 18, the display controller 20 may acquire the settings information stored in the settings memory, and display the settings list screen 100 on the display 14 as illustrated in FIG. 11 which reflects default settings. That is, when the setting status changing unit 21 changes the settings information to the default setting status while the Reset button is displayed on the display 14, the display controller 20 erases the Reset button and then displays the settings list screen 100.

The settings list screen 100 is not limited to the example illustrated in FIG. 5 but may be any form of screen as long as the screen allows the setting status of each of multiple settings to be checked. For example, the settings list screen 100 may be split into multiple pages each containing at least one setting item image 101, and displayed on the display 14 page by page. In this case as well, once the setting status of a setting is changed and the Reset button is displayed in the Reset button region 300, the Reset button may remain displayed in the Reset button region 300 at all times even when the page changes.

Figure 12:
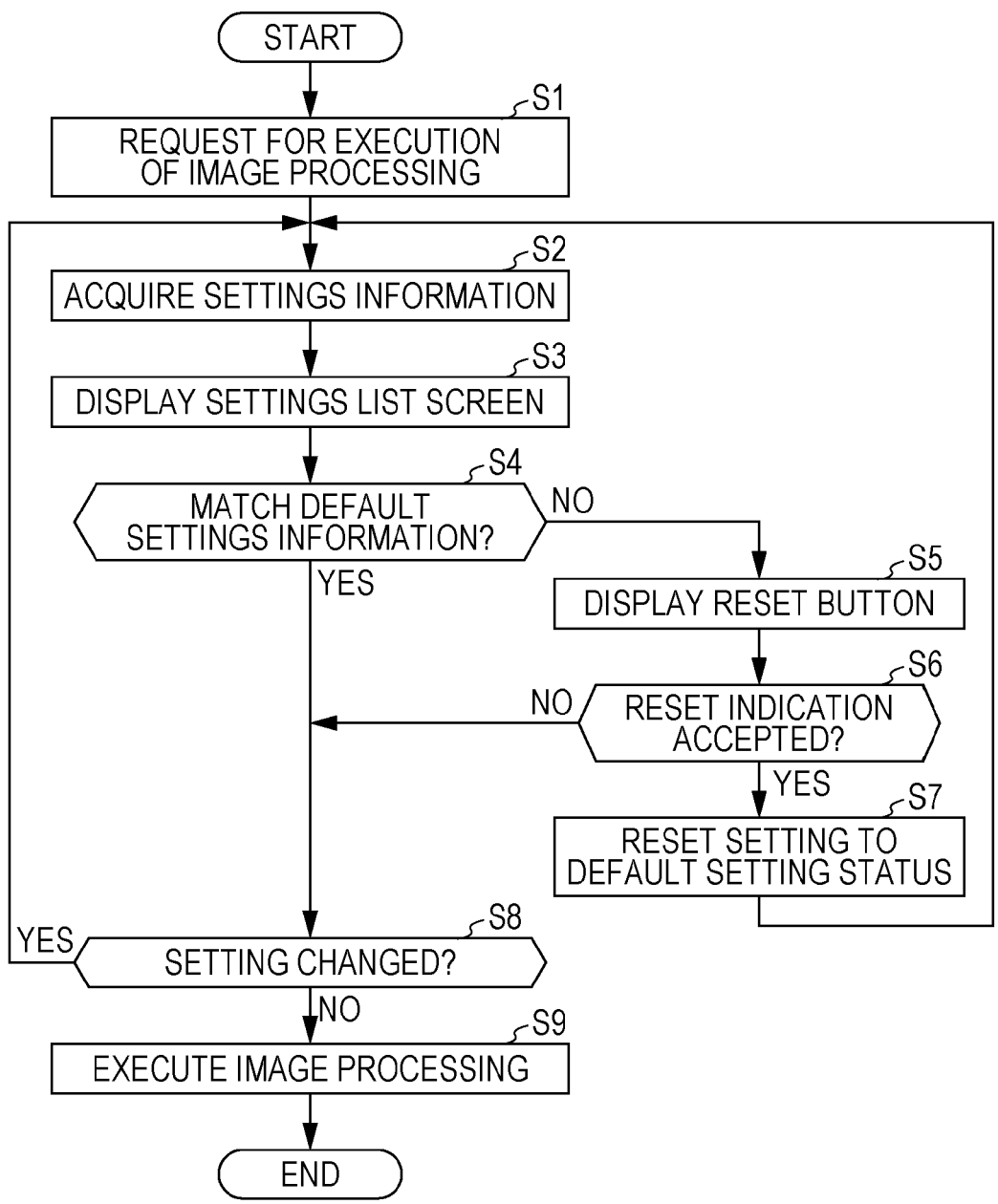
FIG. 12 is a flowchart illustrating an example of a settings screen display process performed during image processing executed by an image processing apparatus according to a first exemplary embodiment.

Hereinafter, referring to the flowchart of FIG. 12, an example of a settings screen display process performed during image processing executed by the image processing apparatus 10 according to the first exemplary embodiment will be described.

First, when the image processing apparatus accepts an image processing execution request (S1), the display controller 20 acquires settings information stored in the settings memory (S2), and displays the settings list screen 100 reflecting the acquired settings information on the display 14 (S3). Then, it is determined whether the settings information acquired in process S2, and default settings information representing the default settings of settings information stored in the memory 12 match (S4).

If it is determined as a result of the process S4 that the settings information acquired in process S1 and the default settings information do not match (S4: N), the display controller 20 displays the Reset button on the display 14 (S5), together with the settings list screen 100 displayed on the display 14 in process S3.

At this time, if the settings information acquired for the first time after the image processing execution request does not match the default settings information, this means that settings information set when image processing is previously executed is maintained. When the Reset button is displayed on the display 14 at this time, the user is able to recognize that the setting status of a setting is not the default setting.

Then, when the operation accepting unit 19 accepts an indication of a reset (S6: Y) when the user selects the Reset button displayed on the display 14, the setting status changing unit 21 changes the setting status so that the settings information stored in the settings memory matches the default settings information stored in the default settings memory 18 (S7). Subsequently, the processes from process S2 onwards are repeated.

If it is determined as a result of process S4 that the settings information acquired in process S2 and the default settings information match (S4: Y), this means that the setting status shown on the settings list screen 100 displayed on the display 14 is default.

Then, when a setting is changed (S8: Y), the processes from process S2 onward are repeated. When no setting change is made (S8: N) and image processing is executed (S9), the display process of the settings list screen 100 ends.

If the operation accepting unit 19 does not accept an indication of a reset in process S6 (S6: N), the processes from process S8 onwards are executed.

Second Exemplary Embodiment

In a second exemplary embodiment, the display controller 20 controls display of the settings list screen 100 in a manner that differs depending on the position where the setting item image 101 whose setting status has been changed from default is located within the display area 200. In the second exemplary embodiment, the display controller 20 controls display in a different manner when the setting item image 101 displayed in a region (the lowermost part of the display area 200 in FIG. 9) of the settings list screen 100 overlapping the Reset button region 300 is to be changed from its default setting status. In the first exemplary embodiment, when the setting item image 101 displayed in a region overlapping the Reset button region 300 is changed from its default setting status, the Reset button is displayed in the Reset button region 300, and thus the setting item image 101 that has been changed from its default setting status is hidden by the Reset button region 300. However, for the convenience of the user such as wanting to check the changed setting status, it is desirable that the setting item image 101 that has been changed from its default setting status be displayed within the display area 200 so as to be visible by the user. Accordingly, when the setting item image 101 displayed at a position overlapping the Reset button region 300 has been changed from its default setting status, the display controller 20 may display the Reset button in the Reset button region 300 and, at the same time, make a correction so that the setting item image 101 that has been changed from its default setting status is displayed within the list screen region 400. Specifically, for example, when displaying the settings list screen 100, the display controller 20 causes the settings list screen 100 to move virtually with respect to the list screen region 400, so that the setting item image 101 that has been changed from its default setting status is displayed in the lowermost part (above the Reset button region 300) of the list screen region 400.

Figure 13:
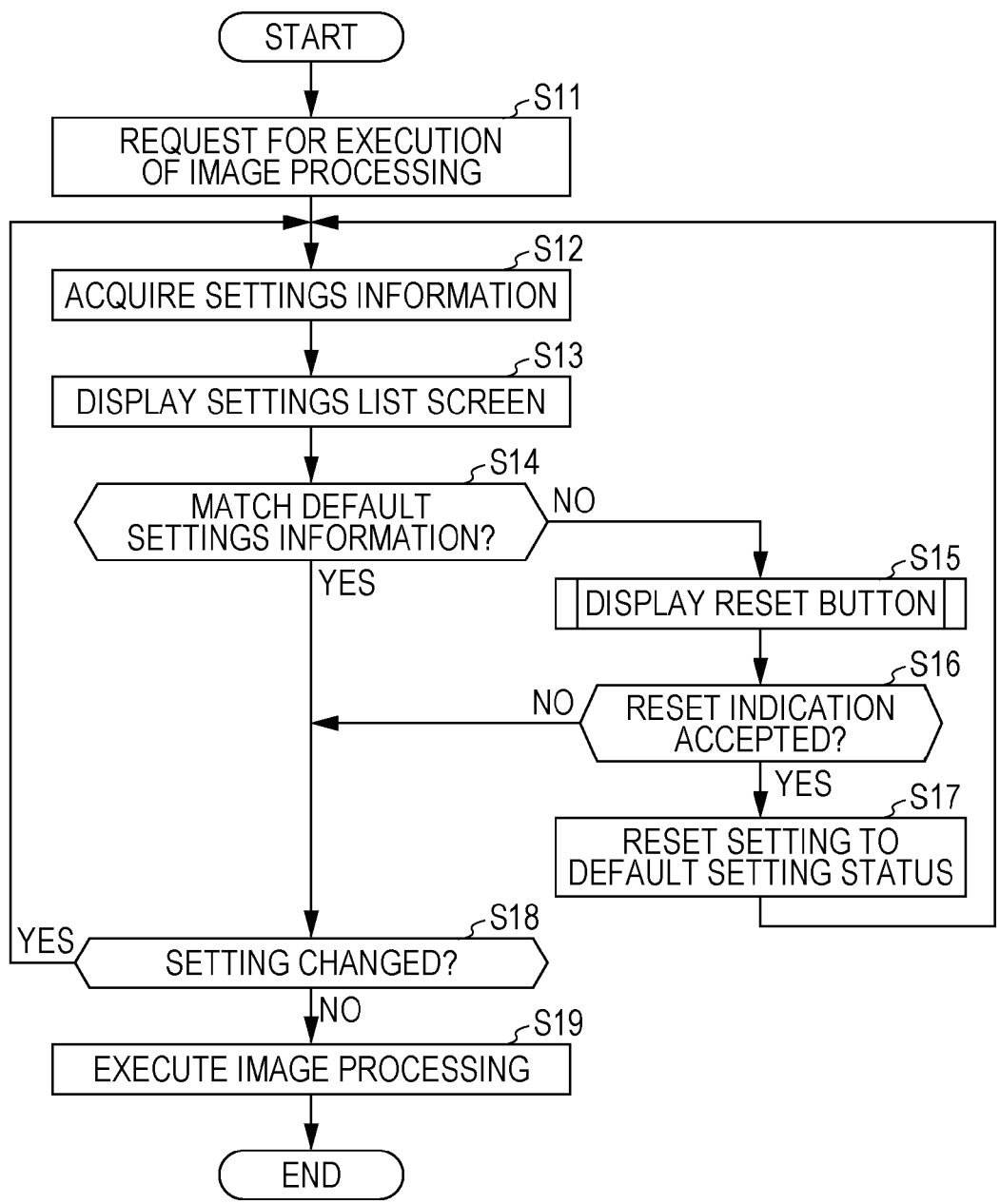
FIG. 13 is a flowchart illustrating an example of a settings screen display process performed during image processing executed by an image processing apparatus according to a second exemplary embodiment.

Hereinafter, referring to the flowchart of FIG. 13, an example of a settings screen display process performed during image processing executed by the image processing apparatus 10 according to the second exemplary embodiment will be described. Processes S11 to S19 in the flowchart illustrated in FIG. 13 are the same as the processes S1 to S9 in the flowchart illustrated in FIG. 12 except for a Reset button display process in process S15, and hence any repetitive description of these processes will be omitted herein.

An example of a Reset button display process performed by the display controller 20 in process S15 will be described with reference to the flowchart in FIG. 14.

<Reset Button Display Process 1>

Figure 14:
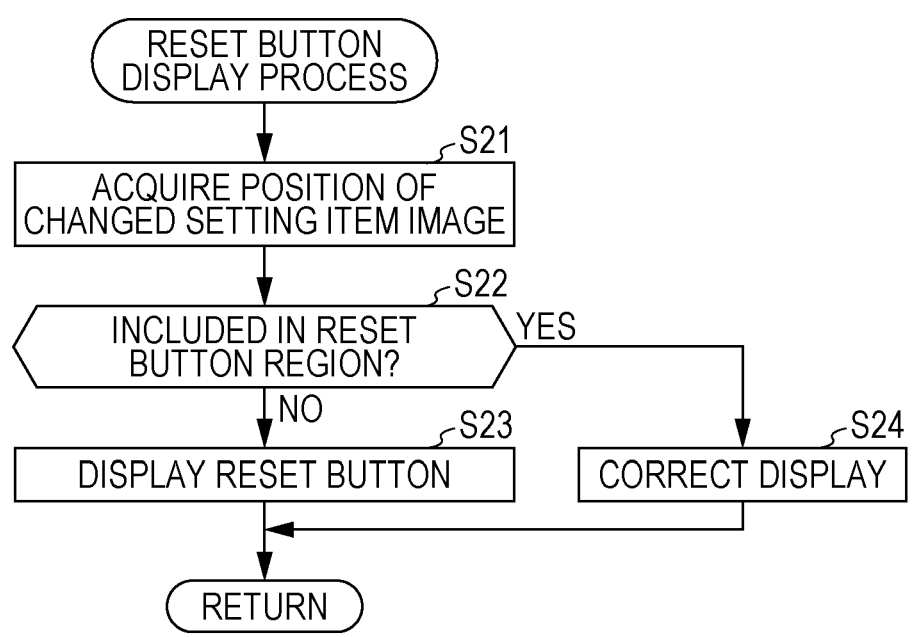
FIG. 14 is a flowchart illustrating an example of a Reset button display process by a display controller.

As illustrated in FIG. 14, first, if settings information stored in the settings memory, and default settings information stored in the default settings memory do not match, a region (display position on the display 14) where the setting item image 101 corresponding to a setting item that does not match its default setting is displayed is acquired (S21).

Then, it is determined whether the display position acquired in process S21 is included in the Reset button region 300 (S22).

Figure 15:
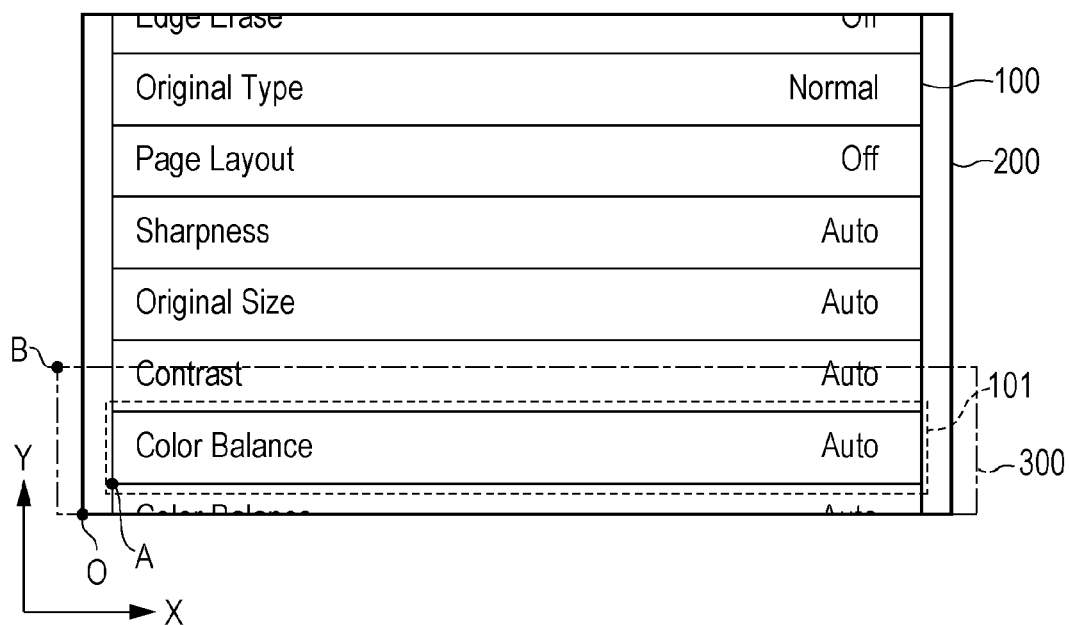
FIG. 15 illustrates an example of a display when a Reset button display process according to the second exemplary embodiment is executed.
Figure 16:
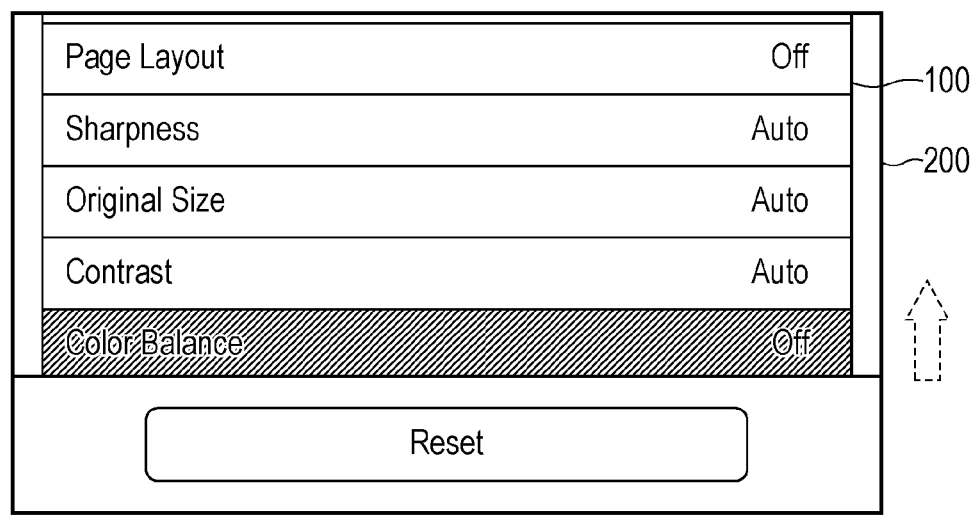
FIG. 16 illustrates an example of a display when a Reset button display process according to the second exemplary embodiment is executed.

FIGS. 15 and 16 each illustrate an example of the display 14 when the Reset button display process according to the second exemplary embodiment is executed. It is assumed that the setting item image 101 corresponding to a setting item that does not match its default setting is "Color Balance". Suppose that the user is to select the setting item image 101 "Color Balance" and change the setting status from the default "Auto" to "off". The display position acquired in process S21 is assumed to be the point on the outer periphery of the setting item image 101 where the value of the coordinate in a Y-axis direction is smallest, when X- and Y-axes are set virtually by using the bottom left point O of the display area 200 illustrated in FIG. 15 as a reference point. Then, the point on the outer periphery of the Reset button region 300 where the value of the coordinate in the Y-axis direction is largest (this point is defined as a Reset button display position), and the display position acquired in process S21 are compared with each other to determine whether the display position acquired in process S21 is included in the Reset button region 300. Specifically, the display position may be defined as the bottom left point A (or bottom right point) of the setting item image 101 "Color Balance" illustrated in FIG. 15, and the Reset button display position may be defined as the top left point B (or top right point) of the Reset button region 300 illustrated in FIG. 15. If the Y-coordinate of the display position is smaller than the Y-coordinate of the Reset button display position, it is determined that the display position is included in the Reset button region 300, and if the Y-coordinate of the display position is larger than the Y-coordinate of the Reset button display position, it is determined that the display position is not included in the Reset button region 300. Alternatively, the point at which a user operation (such as a click or tap) that selects the setting item image 101 "Color Balance" is detected may be defined as the display position. In a case where the Reset button region 300 is located in the uppermost part of the display area 200, the display position acquired in process S21 is the point on the outer periphery of the setting item image 101 where the coordinate value in the Y-axis direction is largest, and the Reset button display position is the point on the outer periphery of the Reset button region 300 where the coordinate value in the Y-axis direction is smallest. In this case, if the Y-coordinate of the display position is larger than the Y-coordinate of the Reset button display position, it is determined that the display position is included in the Reset button region 300, and if the Y-coordinate of the display position is smaller than the Y-coordinate of the Reset button display position, it is determined that the display position is not included in the Reset button region 300.

If it is determined as a result of process S22 that the display position acquired in process S21 is not included in the Reset button region 300 (S22: N), the display controller 20 displays the Reset button in the Reset button region 300 (S23).

If it is determined as a result of process S22 that the display position acquired in process S21 is included in the Reset button region 300 (S22: Y), the display controller 20 corrects display of the settings list screen 100 when displaying the Reset button in the Reset button region 300 (S24). At this time, the display controller 20 causes the settings list screen 100 to move so that the display position of the setting item image 101 corresponding to a setting item that does not match its default setting is included in the list screen region 400. Specifically, if the setting status of the setting item image 101 "Color Balance" corresponding to a setting item that does not match its default setting in FIG. 15 has been changed from the default "Auto" to "Off", as illustrated in FIG. 16, the display controller 20 displays the Reset button in the Reset button region 300 and, at the same time, causes the settings list screen 100 to move upward so that the bottom edge of the setting item image 101 "Color Balance" overlaps the top edge of the Reset button region 300. At this time, the display controller 20 may cause the settings list screen 100 to move only by the amount of the difference between the Y-coordinate of the display position and the Y-coordinate of the Reset button display position.

Then, when the Reset button is displayed on the display 14 by the display controller 20 in process S23 or S24, the processing returns.

Third Exemplary Embodiment

In the third exemplary embodiment, the display controller 20 controls display of the Reset button in a manner that differs depending on the position where the setting item image 101 that has been changed from its default setting status is located on the display 14. In the third exemplary embodiment, when the setting status has been changed from default, the Reset button may be displayed while the setting item image 101 that has been changed from its default setting status is not displayed in the display area 200. Alternatively, the Reset button may be displayed when, after the setting status is changed from default, the settings list screen 100 moves relative to the display area 200 in response to user operation and thus the setting item image 101 that has been changed from its default setting status becomes no longer displayed on the display area 200. This is based on the following idea. That is, while the setting item image 101 that has been changed from its default setting status is displayed in the display area 200, it is possible to change the setting status from the setting item image 101 again, and therefore the Reset button may not need to be displayed as this unnecessarily reduces the display area of the settings list screen 100. By displaying the Reset button while the setting item image 101 that has been changed from its default setting status is not displayed in the display area 200, a reset operation may be performed without moving the setting item image 101 to be changed.

The display controller 20 may be able to switch the Reset button invisible in response to user's indication. In this example, after the setting status is changed from default, and the Reset button is displayed in the display area 200, the Reset button is erased in response to user's indication. Specifically, the Reset button may be erased when the user performs a swipe operation on the Reset button region 300 toward the outside of the display area 200. Alternatively, an Erase button may be displayed in the Reset button region 300 together with the Reset button, and the Reset button may be erased when the user indicates the Erase button.

Hereinafter, an example of a settings screen display process performed during image processing executed by the image processing apparatus 10 according to the third exemplary embodiment will be described. The settings screen display process according to the third exemplary embodiment differs from that of the flowchart illustrated in FIG. 13 only in the Reset button display process in process S14. Accordingly, an example of a Reset button display process according to the third exemplary embodiment will be described with reference to the flowchart of FIG. 17.

<Reset Button Display Process 2>

Figure 17:
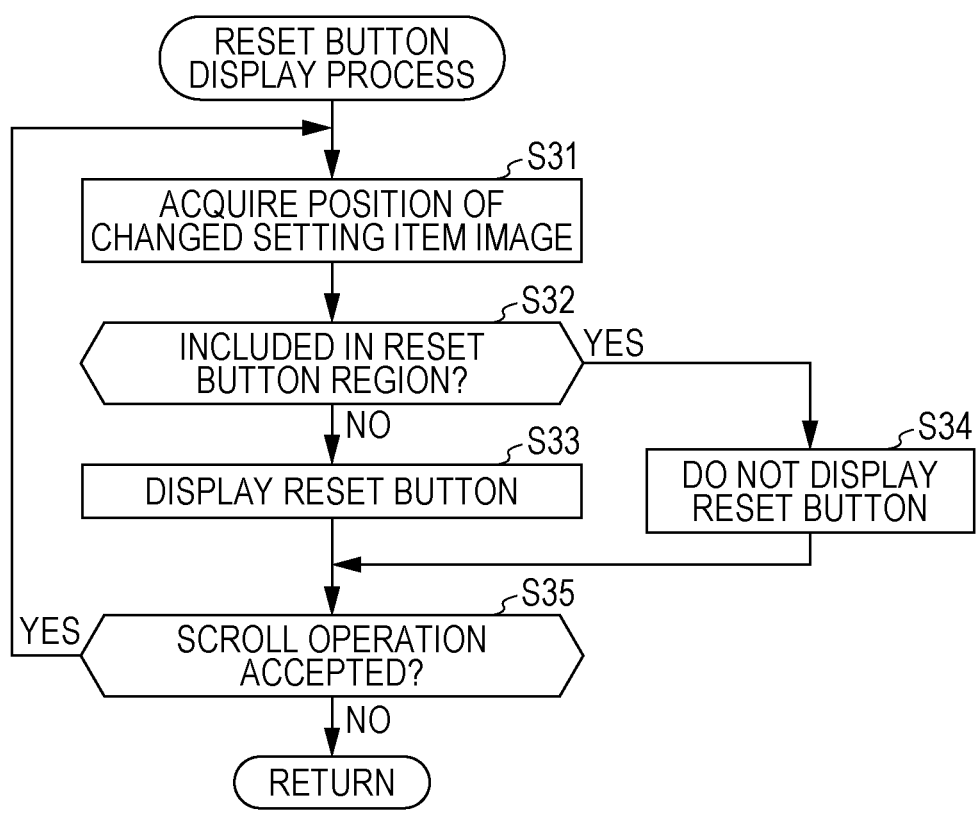
FIG. 17 is a flowchart illustrating an example of a Reset button display process according to a third exemplary embodiment.

First, as illustrated in FIG. 17, if settings information stored in the settings memory, and default settings information stored in the default settings memory do not match, the display position where the setting item image 101 corresponding to a setting item that does not match its default setting is displayed on the display 14 is acquired (S31).

Then, it is determined whether the display position acquired in process S31 is included in the display area 200 (S32).

If it is determined as a result of process S32 that the display position acquired in process S31 is not included in the display area 200 (S32: N), the display controller 20 displays the Reset button in the Reset button region 300 (S33). If it is determined as a result of process S32 that the display position acquired in process S31 is included in the display area 200 (S32: Y), the display controller 20 does not display the Reset button (S34).

If the operation accepting unit 19 accepts a scroll operation on the settings list screen 100 (S35: Y), the processes from process S31 onwards are executed, and if the operation accepting unit 19 does not accept a scroll operation on the settings list screen 100 (S35: N), the processing returns.

Figure 18:
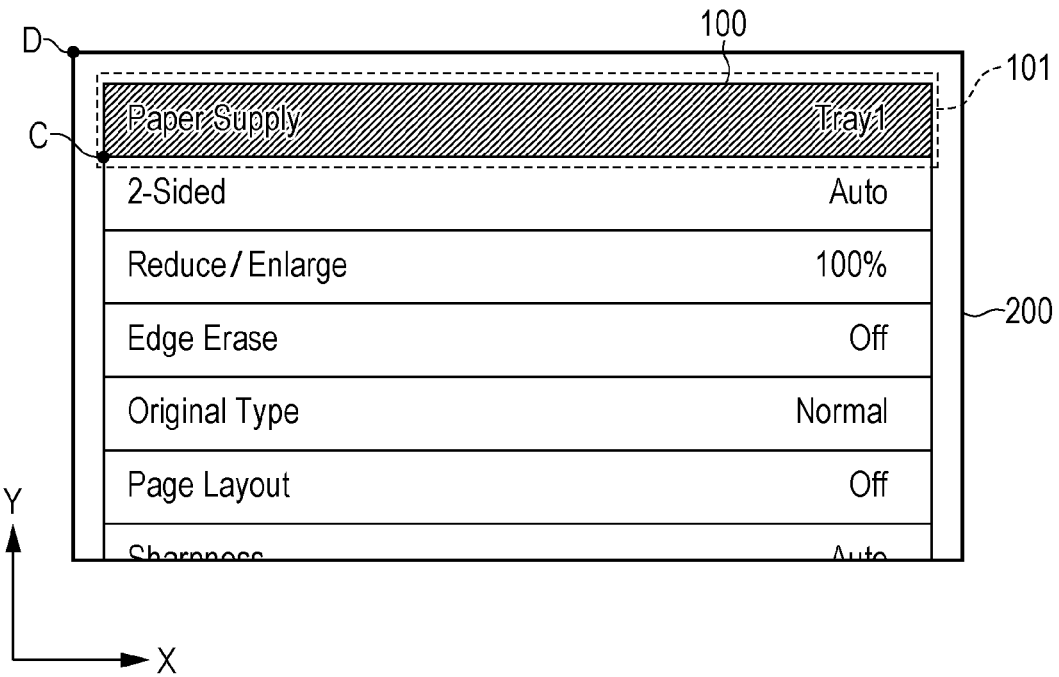
FIG. 18 illustrates an example of a display when a Reset button display process according to the third exemplary embodiment is executed.
Figure 19:
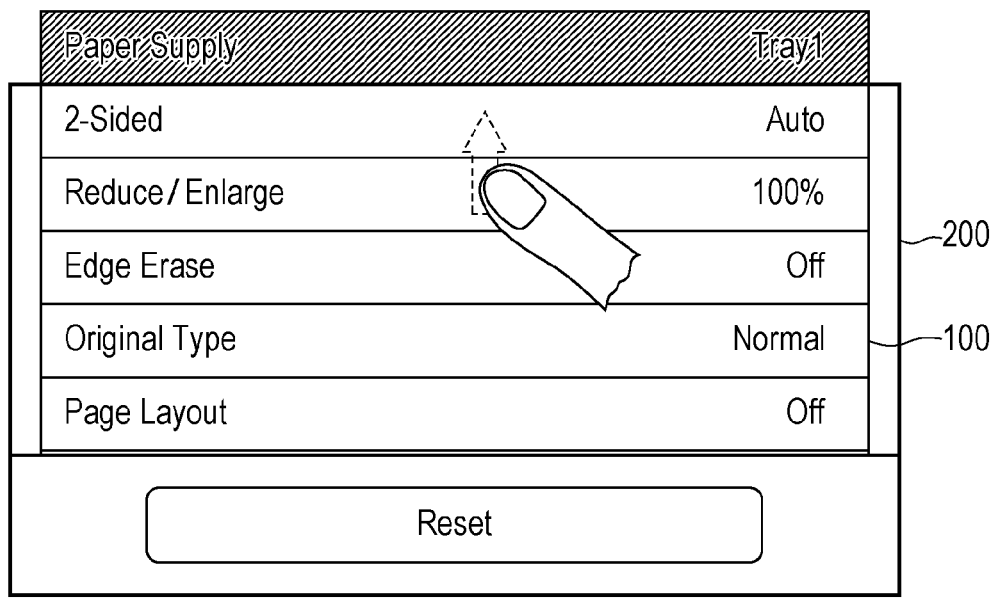
FIG. 19 illustrates an example of a display when a Reset button display process according to the third exemplary embodiment is executed.

FIGS. 18 and 19 each illustrate an example of the display 14 when a Reset button display process according to the third exemplary embodiment is executed. As illustrated in FIG. 18, if the display position (for example, the bottom left point C) where the setting item image 101 that has been changed from its default setting status (the setting item image "Paper Supply" in this example) is displayed on the display 14 is included in the display area 200, the Reset button is not displayed in the display area 200. Specifically, if the Y-coordinate of the bottom left point C is smaller than the Y-coordinate of the top left point D of the display area 200, it is determined that the setting item image 101 that has been changed from its default setting status is included in the display area 200. When the settings list screen 100 illustrated in FIG. 18 is scrolled upward, as illustrated in FIG. 19, the bottom left point C, which corresponds to the display position of the setting item image "Paper Supply" on the display 14, moves to the outside of the display area 200. When the bottom left point C, which corresponds to the display position of the setting item image "Paper Supply" on the display 14, becomes no longer included in the display area 200, the Reset button is displayed. Specifically, if the Y-coordinate of the bottom left point C is larger than the Y-coordinate of the top left point D of the display area 200, it is determined that the setting item image 101 that has been changed from its default setting status is not included in the display area 200, and the Reset button is displayed in the display area 200.

The foregoing exemplary embodiments are not intended to be limiting.

For example, the display position of the Reset button region 300 is not limited to the lowermost part of the display area 200 but may be any position within the display area 200. For example, the Reset button region 300 may be displayed in the uppermost part or at the far ends of the display area 200. The Reset button region 300 may be displayed as a region that may be moved to any position within the display area 200. Further, the position of the Reset button region 300 may be determined in accordance with the position of the setting item image 101 whose setting status is indicated to be changed by the user. For example, the Reset button may be displayed at a position that differs depending on whether the setting item image 101 whose setting status is to be changed by the user is located in the upper half or lower half of the display area 200 with respect to the movement direction of the settings list screen 100. Specifically, if the setting item image 101 whose setting status is to be changed from default by the user is located in the upper half of the display area 200 with respect to the movement direction of the settings list screen 100, the Reset button may be displayed in the uppermost part of the display area 200 with respect to the movement direction of the settings list screen 100. If the setting item image 101 whose setting status is to be changed from default by the user is located in the lower half of the display area 200 with respect to the movement direction of the settings list screen 100, the Reset button may be displayed in the lowermost part of the display area 200 with respect to the movement direction of the settings list screen 100. As a result, the Reset button is displayed near the setting item image 101 that has been changed from its default setting status. Alternatively, if the setting item image 101 whose setting status is to be changed from default by the user is located in the upper half of the display area 200 with respect to the movement direction of the settings list screen 100, the Reset button may be displayed in the lowermost part of the display area 200 with respect to the movement direction of the settings list screen 100, and if the setting item image 101 whose setting status is to be changed from default by the user is located in the lower half of the display area 200 with respect to the movement direction of the settings list screen 100, the Reset button may be displayed in the uppermost part of the display area 200 with respect to the movement direction of the settings list screen 100. Consequently, the Reset button may be displayed without overlapping the setting item image 101 that has been changed from its default setting status.

The position of the Reset button region 300 may be determined in accordance with the position where a user operation (such as a click or tap) that selects the setting item image 101 is detected in the display area 200. In this case, as in the method mentioned above, the Reset button is displayed at a position that differs depending on whether the position at which a user's selecting operation is detected is located in the upper half or lower half of the display area 200 with respect to the movement direction of the settings list screen 100.

While in the foregoing exemplary embodiments a touch panel has been described as an example of a device that accepts an indication of an operation from the user on the display 14, such a device may be any so-called pointing device that allows an operation from the user to be indicated, such as a mouse that allows any position in the display area 200 to be indicated, or a tablet with no display screen which allows any position on the operating surface to be indicated. Furthermore, an indication of an operation from the user may be accepted not by a pointing device but through operation of a button such as a cross button or cursor button.

While the foregoing exemplary embodiments are directed to the settings screen display process performed during image processing executed by the image processing apparatus 10, an apparatus to which the exemplary embodiments may be applied is not limited to this. For example, the exemplary embodiments may be also applied to cases such as where a list screen of some multiple setting items is displayed to change the setting status of a setting item in various types of information processing apparatus such as personal computers, tablets, and mobile terminals.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An apparatus comprising:
  a controller configured to:
    control a display to display a settings screen including a setting status of a setting item set for executing a predetermined process; and
    accept a change to the setting status,
  wherein when the controller accepts the change to the setting status, the controller controls the display to display, on the settings screen, a reset item that accepts an indication to reset the changed setting status to the setting status set prior to the change,
  wherein if a display position of the changed setting status overlaps a display position in which the reset item is to be displayed, the controller causes the display position of the setting status of the setting item to move to prevent an overlap between the display position of the changed setting status and the display position of the reset item, wherein when the setting item has the changed setting status, the controller controls the display to display the reset item on the settings screen, and wherein when the setting item does not have the changed setting status, the controller controls to display the settings screen without the reset item.

2. The apparatus according to claim 1, wherein the reset item is no longer displayed when the changed setting status is reset to the setting status set prior to the change.

3. The apparatus according to claim 2, wherein:
the settings screen includes a plurality of setting statuses respectively of a plurality of setting items; and
the controller controls the display to display, on the settings screen, both of the changed setting status and another setting status of another setting item that is not changed.

4. The apparatus according to claim 1, wherein:
the settings screen includes a plurality of setting statuses respectively of a plurality of setting items; and
the controller controls the display to display, on the settings screen, both of the changed setting status and another setting status of another setting item that is not changed.

5. An apparatus comprising:
a controller configured to:
control a display to display a settings screen including a setting status of a setting item set for executing a predetermined process; and
accept a change to the setting status,
wherein when the controller accepts the change to the setting status, the controller controls the display to display, on the settings screen, a reset item that accepts an indication to reset the changed setting status to the setting status set prior to the change,
wherein the controller causes a display position of the reset item to differ depending on a position where the changed setting status is displayed on the display, and
wherein when the setting item has the changed setting status, the controller controls the display to selectively display the reset item on the settings screen.

6. The apparatus according to claim 5, wherein the controller controls the display to display the reset item while the changed setting status is not displayed on the display.

7. The apparatus according to claim 6, wherein the controller controls the display to not display the reset item while the changed setting status is displayed, and controls the display to display, on the settings screen, the reset item when content of the settings screen is moved relative to a display area, on the display, of the settings screen.

8. The apparatus according to claim 7, wherein:
the settings screen includes a plurality of setting statuses respectively of a plurality of setting items; and
the controller controls the display to display, on the settings screen, both of the changed setting status and another setting status of another setting item that is not changed.

9. The apparatus according to claim 6, wherein:
the settings screen includes a plurality of setting statuses respectively of a plurality of setting items; and
the controller controls the display to display, on the settings screen, both of the changed setting status and another setting status of another setting item that is not changed.

10. The apparatus according to claim 5, wherein if the position where the changed setting status is displayed on the display is located in an upper half of the display, the controller causes the reset item to be displayed at a position in the upper half of the display, and if the position where the changed setting status is displayed on the display is located in a lower half of the display, the controller causes the reset item to be displayed at a position in the lower half of the display.

11. The apparatus according to claim 10, wherein:
the settings screen includes a plurality of setting statuses respectively of a plurality of setting items; and
the controller controls the display to display, on the settings screen, both of the changed setting status and another setting status of another setting item that is not changed.

12. The apparatus according to claim 5, wherein the reset item is no longer displayed when the changed setting status is reset to the setting status set prior to the change.

13. The apparatus according to claim 12, wherein:
the settings screen includes a plurality of setting statuses respectively of a plurality of setting items; and
the controller controls the display to display, on the settings screen, both of the changed setting status and another setting status of another setting item that is not changed.

14. The apparatus according to claim 5, wherein:
the settings screen includes a plurality of setting statuses respectively of a plurality of setting items; and
the controller controls the display to display, on the settings screen, both of the changed setting status and another setting status of another setting item that is not changed.

15. A non-transitory computer readable medium storing a program causing a computer to execute a process, the process comprising:
controlling a display to display a settings screen including a setting status of a setting item set for executing a predetermined process; and
accepting a change to the setting status,
wherein when the change to the setting status is accepted by the accepting, the controlling controls the display to display, on the settings screen, a reset item that accepts an indication to reset the changed setting status to the setting status set prior to the change,
wherein the controlling causes a display position of the reset item to differ depending on a position where the changed setting status is displayed on the display, and
wherein when the setting item has the changed setting status, the controlling controls the display to selectively display the reset item on the settings screen.

16. A non-transitory computer readable medium storing a program causing a computer to execute a process, the process comprising:
controlling a display to display a settings screen including a setting status of a setting item set for executing a predetermined process; and
accepting a change to the setting status,
wherein when the change to the setting status is accepted by the accepting, the controlling controls the display to display, on the settings screen, a reset item that accepts an indication to reset the changed setting status to the setting status set prior to the change,
wherein if a region in which the changed setting status is displayed is included in a region in which the reset item is displayed, the controlling causes a display position of the setting status of the setting item to move to prevent an overlap between the region in which the changed setting status is displayed and the region in which the reset item is displayed, and wherein when the setting item has the changed setting status, the controlling controls the display to selectively display the reset item on the settings screen.

\* \* \* \* \*